March 8, 1960 G. H. BARTLETT 2,927,395
CYLINDRICAL-TYPE LURE HOLDER
Filed Nov. 23, 1956 2 Sheets-Sheet 2

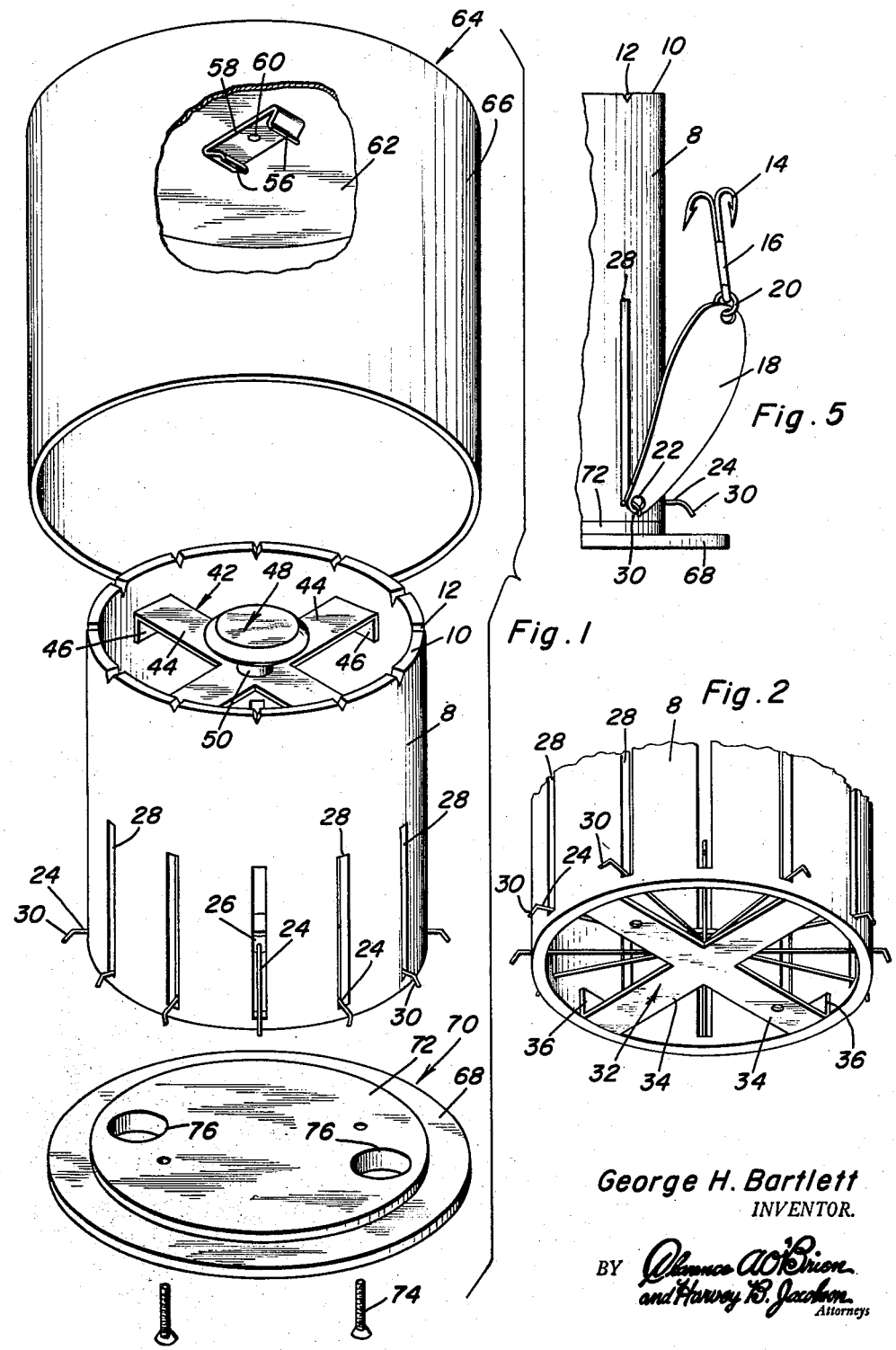

George H. Bartlett
INVENTOR.

BY
Attorneys

United States Patent Office 2,927,395
Patented Mar. 8, 1960

2,927,395
CYLINDRICAL-TYPE LURE HOLDER
George H. Bartlett, Billings, Mont.
Application November 23, 1956, Serial No. 623,940
2 Claims. (Cl. 43—57.5)

The present invention relates to a holder and protector for artificial lures, spoons for example, and pertains to a cylindrical type holder on which the spoons are systematically hung and stored more efficiently and satisfactorily, it is believed, than is capable of accomplishment in analogous holders.

As exemplary of the general state of the art to which the instant invention relates refer to a patent to Snyder 2,658,300 of November 10, 1953, which shows a cylindrical-type holder having base means and individual spring or hold-down members having hooks to accommodate snells with the fishhooks on the snells detachably hung over an upper end of the cylinder. An encased or boxed-in lure holder in which hook-equipped plugs are racked on radial spring fingers is shown in a patent issued to one Archer 2,665,517 of January 12, 1954.

It will be evident that the instant invention involves a construction which is believed to be an improvement upon the above named patents and any analogous prior art lure holders which are currently known to this applicant. To this end the present invention therefore has reference to a simple and practical holder of general cylindrical form having cruciform braces mounted in the upper and lower ends thereof, the upper brace having a knob-like retainer for a resilient clasp or clip on a cap-like cover which fits over and encloses the holder.

A further improvement resides in providing the lower portion of the cylinder with circumferentially spaced longitudinal slots exposing laterally bent ends for a plurality of fingers embodied in a novel spider construction, the spider construction having a hub at its center with the hub supported on the central portion of the lower cruciform brace.

The invention also features a base for the cylindrical holder which has finger holes therein, making it possible to conveniently catch hold of the base and cylindrical holder for purposes of applying and removing the cap-like cover.

Objects, features and advantages in addition to those specifically mentioned will become evident from the description of the details and the views in the accompanying sheets of drawings.

Figure 3:
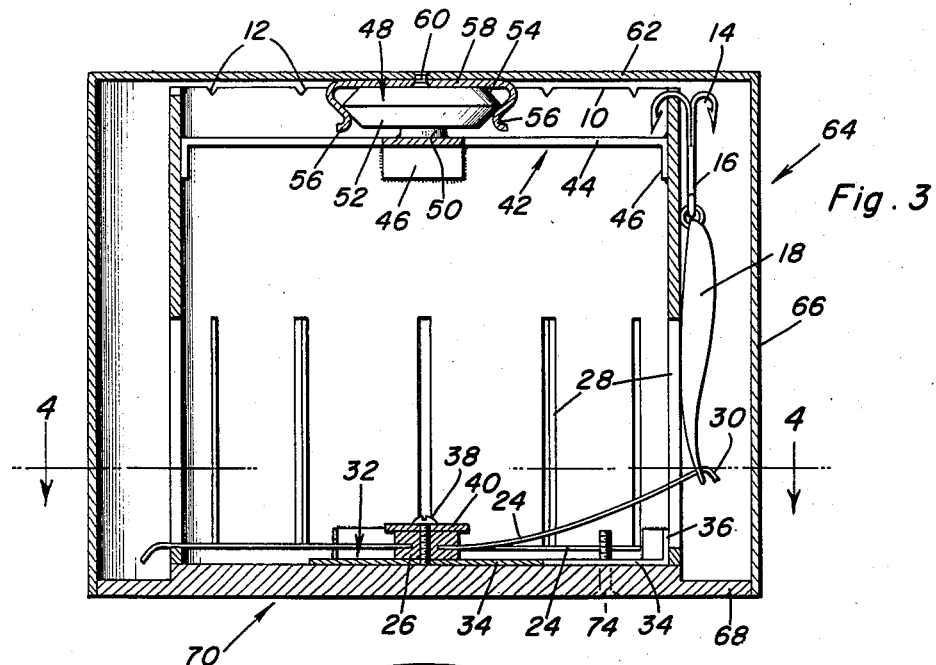
Figure 4:
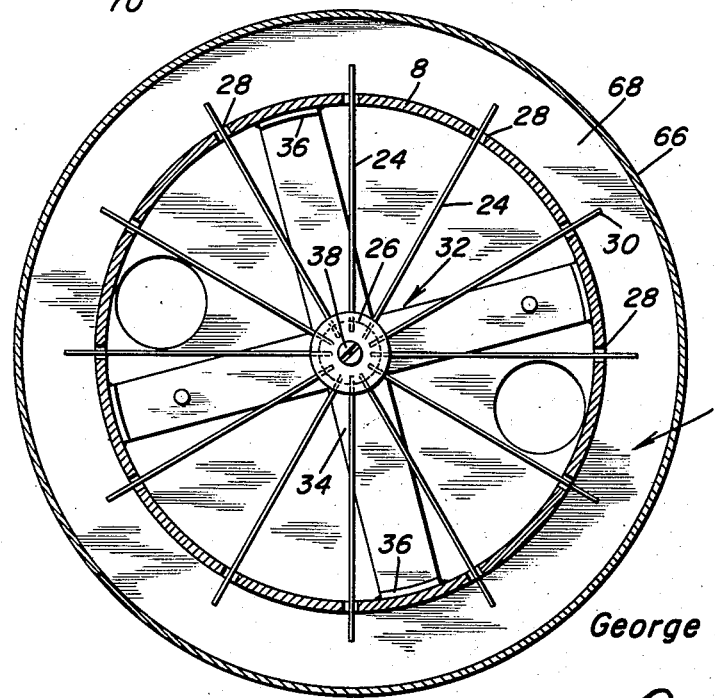

In the drawings:
Fig. 1 is an exploded perspective view of the improved cylindrical-type artificial lure holder;
Fig. 2 is a fragmentary perspective view of the lower end portion of the cylindrical holder, or rack, as it is sometimes called;
Fig. 3 is a view in section and elevation of the complete lure holder in use;
Fig. 4 is a section on the horizontal line 4—4 of Fig. 3; and
Fig. 5 is a fragmentary elevational view detailing the manner of applying and removing one of the spoon-type lures.

As is well-known haphazard placement of lures, especially those with attached fishhooks, in tackle boxes has always posed a problem for most fishermen because they are likely to get tangled together and hazardous to separate and remove when needed for use. The instant invention seeks to provide a simple, practical and an expedient structure which overcomes perplexing difficulties attending entangled lures.

Referring now to the drawings and to Fig. 1 the cylindrical storing holder or rack is denoted by the numeral 8. It is of suitable material and comprises an open-ended cylinder, the upper edge 10 of which is provided with circumferentially spaced keeper notches 12 which serve to seat the barbed bills 14 of the multiple prong hooks 16. This construction lends itself to ideal accommodation of hook-equipped spoons. In the drawings the spoons are denoted by the numerals 18 and the shank of each hook is attached by a ring or the like 20 to one end of the spoon. The other end of the spoon is provided with the usual eye or opening 22. The means for anchoring and detachably retaining the apertured lower ends of the spoons is novel in the instant case and comprises what may be broadly defined as a spider construction. The spider may be of one-piece construction but is illustrated as comprising a plurality of radial circumferentially spaced horizontally disposed springy fingers 24 the inner ends of which are embedded or otherwise suitably connected to a hub-like block or the like 26. The outer free ends extend through and beyond the slots 28. The extreme outer ends of the fingers are laterally bent to provide hook-like detents 30 which are releasably engaged in the openings 22 in the manner shown for example in Figures 3 and 5. Fig. 3 shows the arrangement wherein the spring finger 24 is bent up and is under tension and serves to impose a downward stress on the spoon and to thus anchor the hook means in the keeper notch at the top of the cylinder. Fig. 5 shows one of the fingers not under tension and wherein it may be assumed that the spoon is being attached or detached as the case may be. The hub-like block is secured to the central portion of a cruciform brace 32 (Fig. 2) the arms 34 of which are circumferentially spaced, radiate, and have upturned terminals 36 joined to the inner periphery of the shell-like cylinder 8. Specifically the block rests on the center of the brace and is fastened thereto by a screw 38 passing through a washer 40, all as seen in Fig. 3. Thus the lower end of the cylinder is braced and the brace serves as a mounting for the hub portion of the novel spider.

There is a similar cruciform brace at the upper end of the cylinder and this is denoted by the numeral 42 and here again it is provided with circumferentially spaced horizontal rigid arms 44, the outer ends of which are downturned or laterally bent as 46 and are welded or otherwise secured to the interior of the cylinder in a plane below the upper edge 10 of the cylinder. This brace serves as a reinforcing member for the cylinder and also as a mount for a keeper denoted generally by the numeral 48. The keeper comprises a neck 50 joined integrally with the central portion of the cruciform brace 42 and having a head with upper and lower bevelled surfaces 54 and 52. These bevelled surfaces serve to accommodate the resilient hook-like grips 56 on the clasp or clip 58. A suitable fastening 60 serves to secure the clip to the central portion of the cap-like cover, that is portion 62. The cover itself is denoted as an entity by the numeral 64 and has a cylindrical depending body portion 66 which fits down over the marginal edge of the outer portion 68 of a disk-like base 70. The base has an elevated center portion 72 on which the spider 32 rests and is secured by fastening screws or the like 74. This base is also provided with diametrically opposite finger holes 76 which allow the user to put his fingers through the same and to catch hold of the base and to hold the base and the cylinder 8 which is anchored thereon and to thus readily remove or attach the cover 64. This construction is thought to be necessary because of the fact that the cover has spring clip means engaging the button-like keeper 48 fixed to the upper cruciform brace 42.

In using the device it is necessary, of course, to catch hold of the base with one hand by placing the fingers through the finger holes 76 in the manner already touched upon. It follows that the base and the cylinder attached thereto are held as a unit. With the other hand the user catches hold of the cover and exerts a pull thereon sufficient to release the clip 58 from the button-like keeper 48. The same general use of the hands is employed in replacing and fastening the cover to assume the position seen in Fig. 3. As to the spoons or lures and the manner in which they are applied and removed thus appears to be substantially self-evident from the drawings alone. However, it may be repeated that the hook means 14 is engaged in a selected keeper seat 12 on the upper edge 10 of the cylinder 8. The spoon proper 18 then lies alongside the exterior surface of the cylinder and the hook or laterally bent outer end 30 of a selected one of the spider fingers is passed through the hole 22 and the spoon is held in the manner seen in Fig. 3.

It is believed that the specification when read in conjunction with the views of the drawings will enable the reader to obtain a clear understanding of the construction, mode of use and features and advantages of the invention. Therefore, a more limited description is believed to be unnecessary.

What is claimed as new is as follows:

1. A holder for artificial lures comprising a horizontal base, a horizontal brace mounted atop said base, a cylinder having its lower end cooperating with said base and attached to cooperating arms of said brace, the upper portion of said cylinder being imperforate and the lower portion thereof being provided with circumferentially spaced vertical slots, a block-type hub separably anchored at the center of said base, a plurality of horizontal circumferentially spaced resilient fingers coplanar with and having their inner ends secured to said hub, said fingers and hub constituting a spider, said fingers extending outwardly through and beyond their respective slots and being free and provided with downturned bends adapted to releasably cooperate with intended portions of lures which are attached to or detached from said cylinder, the upper edge of said cylinder having circumferentially spaced keeper notches therein lined up with their respective slots and fingers cooperating with said slots and said brace being interposed between the hub and top of said base, and common fastening means securing the hub and brace together.

2. For use in systematically racking and storing a plurality of artificial lures, a lure holder comprising a horizontal base, a cylinder cooperating at its lower end with said base and rising perpendicularly from said base, the upper edge of said cylinder being provided at circumferentially spaced points with keeper notches, said cylinder being further provided with vertically disposed circumferentially spaced slots aligned with and cooperable with said keeper notches, a spider embodying a block-like hub removably mounted at the central portion of said base, a plurality of resilient fingers generally paralleling said base and spaced above the base and having their inner ends attached to circumferentially spaced portions of said block-like hub, the outer ends of said fingers being free and resilient and extending through and beyond their respective slots, and a cruciform brace interposed between said base, block-like hub and said fingers, said brace embodying circumferentially spaced arms connected at their outer ends to the interior of the lower end portion of said cylinder.

References Cited in the file of this patent

UNITED STATES PATENTS

| | | |
|---|---|---|
| 223,641 | Finley | Jan. 20, 1880 |
| 449,939 | Koch | Apr. 7, 1891 |
| 1,451,256 | Gardner | Apr. 10, 1923 |
| 1,728,473 | Brosius | Sept. 17, 1929 |
| 2,540,732 | Hobein | Feb. 6, 1951 |
| 2,658,300 | Snyder | Nov. 10, 1953 |
| 2,665,517 | Archer | Jan. 12, 1954 |

FOREIGN PATENTS

| | | |
|---|---|---|
| 912,073 | France | Apr. 5, 1946 |